Patented Jan. 5, 1954

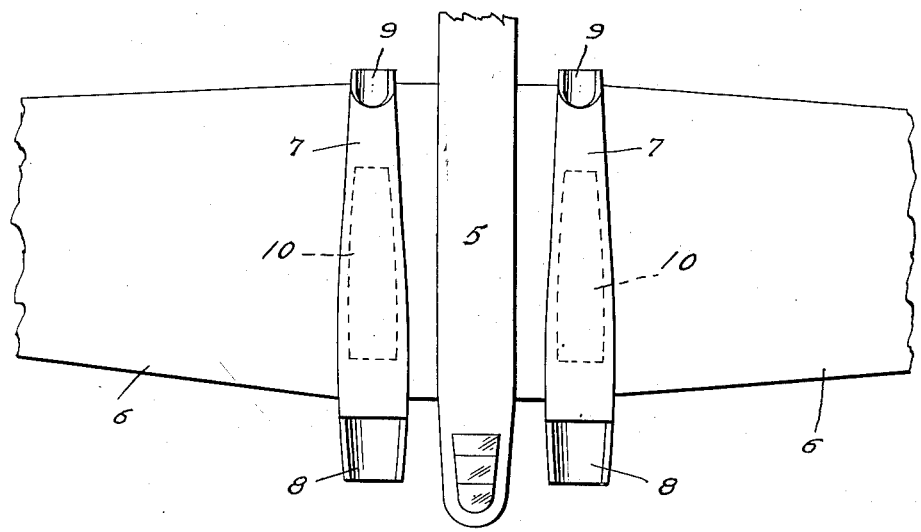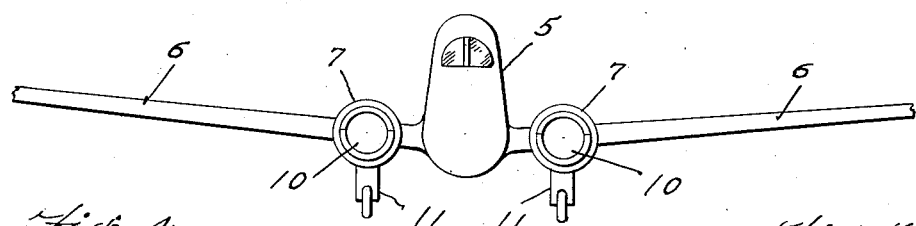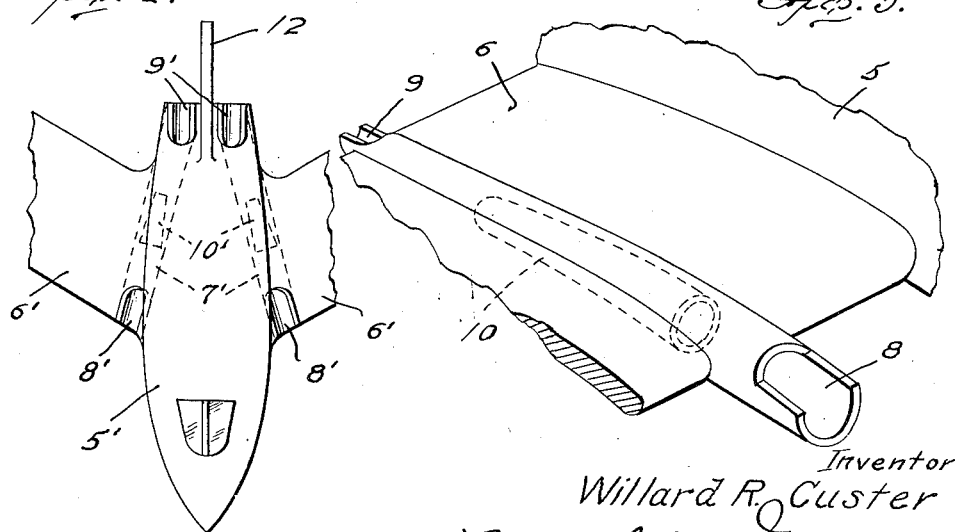

2,665,083

UNITED STATES PATENT OFFICE 2,665,083

JET-PROPELLED CHANNEL AIRCRAFT

Willard R. Custer, Hagerstown, Md.

Original application January 31, 1950, Serial No. 141,555, now Patent No. 2,611,555, dated September 23, 1952. Divided and this application April 8, 1952, Serial No. 281,200

8 Claims. (Cl. 244—12)

This invention is a jet propelled channel aircraft and is a division of my application, Serial No. 141,555, filed January 31, 1950, now Patent No. 2,611,555, issued September 23, 1952.

The object of this invention includes the employment of a conduit in the lifting surface of the aircraft a part of the conduit being formed to provide an upwardly opening channel, which communicates with a jet motor mounted in the conduit, to produce a lift not available in the conventional jet propelled aircraft, resulting in greater stability in take-off and landing.

The other objects of the invention will be apparent from the following description of the presently preferred forms of the invention taken in connection with the accompanying drawing, wherein:

Fig. 1 is a top plan view of an aircraft constructed in accordance with the present invention, the wings and fuselage being shown fragmentarily;

Fig. 2 is a front elevational view of the same;

Fig. 3 is a detail fragmentary perspective view of the aircraft showing the manner of mounting one of the jet motor-contained tubes in one of the wings in accordance with the teaching of the present invention, and Fig. 4 is a fragmentary top plan view of a modified form of the invention wherein tubes are mounted at opposite sides of the fuselage.

The device of the present invention comprises a fuselage 5 and wings 6 of conventional construction. Each of the wings has a tube or conduit 7 mounted therein in parallel relation to the fuselage and in relatively close proximity thereto as shown in Figs. 1 to 3 of the drawing. In a form of the invention the tube 7 extends forwardly beyond the leading edges of the wings 6, the opposite ends of the tube extending beyond the aft edges of the wings. The upper half of the front end of each tube is removed to provide a semi-cylindrical channel 8 which opens upwardly and extends in the direction of flight. Preferably the channels 8 extend wholly in advance of the leading edges of the wings 6, although I am aware that good results may also be obtained under certain conditions by having the forward ends of the channels in the same vertical plane with the leading edges of the wings. The rear end of each tube 7 also has its upper half removed to provide channels 9. It will be noted, particularly upon reference to Fig. 1 of the drawing, that the inner end of each channel 9 is well in advance of the aft edge of its wing for a purpose more fully hereinafter set out. Also I am aware that good results may also be obtained under certain conditions by terminating the aft ends of the channels 9 to coincide with the aft edges of the wings 6.

Mounted within each tube 7 is a jet motor, as indicated by dotted lines 10, the motor being preferably positioned approximately midway the channels 8 and 9. By cutting back the channels 9, as shown in Fig. 1 of the drawing, the exhaust from the jet motors passes into the atmosphere before reaching the aft edge of the wing for increased lift efficiency under certain conditions.

A landing gear 11 of any conventional type may be suspended from the bottom of each of the tubes 7, as shown in Fig. 2.

In a modified form of the invention illustrated in Fig. 4 a fuselage 5' and wings 6' of standard construction are shown. The root of each wing is provided at its leading edge with an upwardly opening channel 8' which forms a forward end of a jet tube or conduit 7', said tubes converging in the aft end of the fuselage 5' at a point remote from the aft edges of the wings 6'. The upper half of the aft end of each tube 7' is removed to provide an aft channel 9', which channels extend on opposite sides of a tail 12. A jet motor 10', as indicated by the dotted lines, is mounted in each of the tubes 7' in communication with the channels 8' and 9'.

When the jet motors 10 and 10' are in operation a lifting force is induced which is greatest when the aircraft is static or moving at a very low speed. The lifting force is a function of the difference in speeds of the air and gas in the channels 8, 8', 9 and 9' and the air beneath said channels. This lifting force lends greater stability to the aircraft in take-off and in landing operations since, in case of emergency, it enables the aircraft to sustain itself until the conventional reaction to the thrust gives the aircraft more velocity. By directing air into the intake of the engine by means of a channel, more air will pass through the mouth of the engine. Also the choking off effect caused by insufficient supply of air, prevalent with conventional type of jet planes, will be alleviated and the jet motors will have greater thrust and greater over-all efficiency.

Various changes may be made in the invention within the scope of the claims hereto appended.

What I claim is:

1. An aircraft comprising a wing, a tube mounted in the wing, the opposite ends of the tube being semicylindrical and opening upwardly to provide fore and aft channels, and a jet motor mounted in the tube in communication with said channels.

2. An aircraft including a lifting surface, a tube mounted in the lifting surface, an end of the tube having its upper wall removed to provide an upwardly opening channel, and a jet motor mounted in the tube in communication with said channel.

3. An aircraft comprising a wing, a tube mounted therein, a jet motor disposed in the tube, the lower half of each terminal of the tube being extended to provide an upwardly opening channel at each of said tube ends in communication with the jet motor.

4. An aircraft comprising a wing, a tube mounted therein, a jet motor disposed in the tube, upwardly opening channels formed at the extremities of the tube, said channels extending fore and aft the jet motor in communication with the jet motor.

5. An aircraft comprising a fuselage, wings extending from the opposite sides of the fuselage, each wing being provided with a conduit extending chord-wise from the leading edge of the wing and extending beyond the aft edge of the latter through the aft edge of the fuselage, the top of the fore and aft extremities of each conduit being removed to provide upwardly opening channels extending in the direction of flight, and a jet motor mounted in each conduit between the fore and aft channels in communication with the latter.

6. In an aircraft including a fuselage and wings extending from opposite sides thereof, chord-wise extending tubes in each wing, the leading and trailing terminals of said tubes being semi-cylindrical upward opening channels, and a jet motor mounted in each tube and in communication with its channels.

7. An aircraft comprising a fuselage, wings extending from the opposite sides of the fuselage, each wing being provided with a conduit, the top of the fore and aft extremities of each conduit being removed to provide upwardly opening channels extending substantially in the direction of flight, the conduits converging with respect to one another toward their aft extremities, and a jet motor mounted in each conduit between the fore and aft channels and in communication with the channels.

8. An aircraft comprising a fuselage, wings extending from the opposite sides of said fuselage, a tube mounted substantially at the juncture point of each wing with the fuselage and extending substantially in the direction of flight of the aircraft, an end of each tube having its upper wall removed to provide an upwardly opening channel in each tube and a jet motor mounted in each tube in communication with the channel therein.

WILLARD R. CUSTER.

References Cited in the file of this patent

UNITED STATES PATENTS

| Number | Name | Date |
| --- | --- | --- |
| 2,532,482 | Custer | Dec. 5, 1950 |
| 2,611,556 | Custer | Sept. 23, 1952 |